T. Hyatt,
Vault Cover,
No. 11,695.  Patented Sep. 19, 1854.
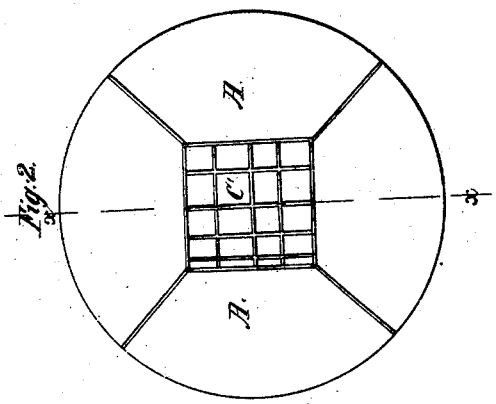
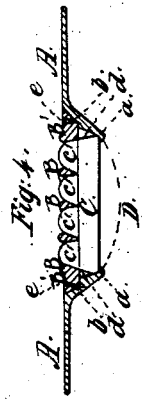
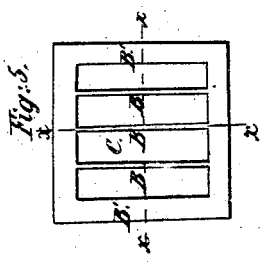
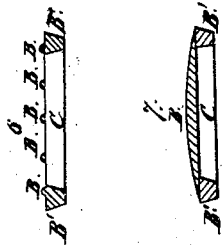
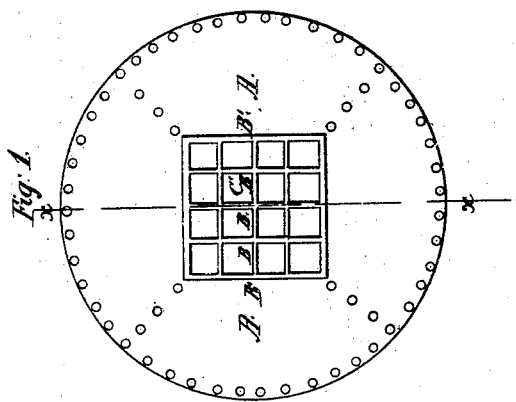

UNITED STATES PATENT OFFICE.

THADDEUS HYATT, OF NEW YORK, N. Y.

VAULT-LIGHT.

Specification of Letters Patent No. 11,695, dated September 19, 1854.

*To all whom it may concern:*

Be it known that I, THADDEUS HYATT, of the city, county, and State of New York, have invented certain new and useful Improvements in the Manner of Constructing an Illuminating Vault-Cover for the closing of openings from streets or yards into vaults and through the decks of vessels into cabins and for all other situations where the glass used in such covers is liable to be broken out, and where in such cases persons stepping upon them are exposed to harm, the object of the present improvements being to secure the greatest amount of light compatible with full protection to the glass against accident and the public against injury.

2. The ordinary illuminating vault cover is simply a rim of metal with a large glass set in its center. This glass when trodden upon becomes soon scratched, then fractured, and finally broken into pieces which fall out, and so leave a dangerous opening, jeopardizing both the lives and limbs of those who pass over it.

3. To remedy these evils, I devised, and in 1845 secured a patent for a vault cover wherein a series of small holes occupied the place of the one large hole of the ordinary cover; these holes were overlaid by a series of small glasses, held in place by a covering plate of metal having openings to match the glasses, and through which they protruded.

4. An increase of light over my cover of 1845, with a like security to the glass against accident, and the public against injury form the basis of the present application for a patent. This object, viz: an increase of light, is obtained by having one large opening in the metal frame forming the vault cover, filled by one large glass as in the ordinary illuminating cover above referred to, it being evident that the greater the diameter of a hole compared to its depth, the greater the number of angular rays of light admitted through it. But the glass instead of being left exposed as in the ordinary illuminating cover, is protected by a grating, or covering plate of metal having holes therein, as hereinafter more fully described, by which means the glass is more perfectly preserved from being scratched or broken, and a dangerous opening is prevented, which might otherwise occur, to the serious injury of many persons.

5. From the preceding it may be understood that the vault cover herein described is composed of three main parts, viz: 1st a glass plate. 2d, a metal frame to hold the glass. 3d, a grating or covering plate of metal to protect the glass, and prevent a dangerous hole being formed by the breaking out of the glass.

6. As to the glass, I use 1st, either a glass, plane upon both the upper and under surfaces, and sufficiently large in its diameter to fill the aperture in the metal frame, or 2ndly, I use a glass plate plane on its under surface, but having its upper one channeled so as to form either ridges or knobs thereon, the knobs being either circular or square; or 3dly, I use a double layer of glass, as is more fully described in what follows.

7. As to the metal frame which holds the glass, it is simply a rim of metal forming the main body of the vault cover. The hole in its center to receive the glass may be of any convenient size. Two rabbets, one above the other, are formed in the frame around the central hole, the lower one of which is for the glass to rest in, and the upper one of which is for the grating to rest in above the glass.

8. As to the grating or glass protector, it is in diameter about two inches larger than the glass which it covers, and rests in the metal frame in a rabbet, as beforementioned, to which it is confined by bolts or screws. The form of this glass protector or covering plate depends entirely upon the form of the glass which it covers, as an improperly constructed covering plate might entirely defeat the object for which a glass is required in a vault cover, as will more fully appear from what follows.

9. An ordinary grate is composed of a frame and bars attached thereto, which cross through the central space inclosed within the frame, the upper and under surfaces of the bars being in the same plane with the frame. Let such a grating as this be placed upon the level surface of such a glass as is mentioned and described 1st, in paragraph 6, and it is evident that in an exposed situation, the spaces between the bars would become rapidly choked with dirt in summer and with ice, snow and mud in winter:—these accumulations could be neither swept nor brushed out—they must be dug out at a great expense of time and trouble, an objection as fatal to the usefulness of such a vault cover, as to the profit of the maker thereof. Hence it is apparent that the upper face of the glass must not be below the general surface of the vault cover, nor must it be covered by any metal plate or grating having interstices to hold the dirt from which it cannot be swept as readily as from any other part of the cover.

10. A glass like that described 1st in paragraph 6, if protected by a covering plate, must have one in the form of a grate all of whose bars run parallel to each other, there being no cross bars. The space inclosed within the grate frame must be unobstructed by the bars, which instead of crossing through it, must cross above it, and consequently the ends of the bars must be lapped on to the upper side of the grate frame, as may be seen by reference to the drawing. By this arrangement of the parts the grate frame instead of surrounding its bars, incloses the glass, so that the upper face of the glass rises up to the same level with the face of the vault cover, the bars of the grating being above it as well as above the grate frame to which it is attached as aforesaid.

11. The second form of glass mentioned in paragraph (P) 6, is adapted to a grating made in the usual manner, with or without cross bars. In this case the grate bars sink into the channels in the upper face of the glass, the projecting portions of the glass whether in the form of ridges or knobs, rising up into the spaces between the grate bars, and filling them to the exclusion of dirt, snow, ice, &c.

12. The 3d form of glass described in paragraph (P) 6 consists of a double layer of glass for greater security against accident, so that if the upper one should get broken out, a dangerous hole may not be exposed in the interval of its repair. The glasses are set in the vault cover in the manner above described. The upper glass may consist of one or many, the arrangement of which from what has already been said, will be readily understood by reference to the drawing accompanying and to the description thereof below. India rubber or other suitable material may be introduced between the layers of glass.

13. Referring to the annexed drawing making part of this specification, Figure 1 is a top view—Fig. 2, a reverse view thereof—Fig. 3, a transverse section of the same through the line $x, x$. Fig. 4, is a transverse section similar to Fig. 3, but showing a double layer of glass as above described; the upper layer being composed of a number of small glasses or knobs like the protuberances on the glass described "secondly" in paragraph 6. Figs. 5, 6 and 7 show a glass as described 1st in paragraph 6, in combination with a grating as described in paragraph 10.

Similar letters correspond to each other in all the figures.

A, A, is the metal frame forming the main portion of the vault cover, in which the glass C and the grating B', B', B, B, B rest, each in a rabbet as seen at $a, a, b, b$, Figs. 3 and 4.

D Figs. 3 and 4, is the central opening in the metal frame A, A, occupied by the glass C. $d$— $d$— Figs. 3 and 4 is a space about the edges of the glass which is filled in with putty to make a water tight joint. $c'\ c'\ c'\ c'$ represent the knobs of glass alluded to in paragraph 6. Fig. 3 shows them as the result of channels sunk in the face of the glass plate C. Fig. 4 shows them separate from the glass plate C and forming a layer above it as described "3dly" in paragraph (P) 6.

B' B' seen in all the figures except 2 (most distinctly at 5) shows the grating mentioned at "3d" in paragraph 5. The small capitals B, B, B, B, B, show the bars of the grating while the two large capitals B' B' indicate more particularly the frame of the grating to which the bars are attached.

Fig. 6 is a cross section of Fig. 5 at $x$—$x$. Fig. 7 is a cross section of Fig. 5 at $x'$—$x'$. These transverse sections illustrate paragraph (P) 10.

Figs. 3 and 4 illustrate paragraph 11, showing in Fig. 3 the channels in the face of the glass C into which the bars B, B, B, B, B, of the grating B' B' sink and between the spaces of which bars the knobs $c'\ c'\ c'\ c'$ on the glass C rise to the level of the main cover, where they are slightly convex, the convexity being that much higher than the main level of the cover. Fig. 4 showing the same principle but the knobs being independent of the plate C but resting as a layer upon it.

$a, a$, and $b, b$, in Figs. 3 and 4 illustrate paragraph 7, showing the rabbets in the metal frame A, A.

Having thus fully described the nature of my improvements, what I claim and desire to secure by Letters Patent, is—

The making a vault cover by the union of two metal pieces, of which, one is formed as a grating, and the other is formed with an opening whose area is at least equal to the combined area of all the openings in the grating; (the area of the one being covered over by the grate-bars of the other) in combination with a glass or layers of glass protected by the grating, and covering the opening of the metal frame in which they are set substantially in the manner and for the purposes above described.

THADDEUS HYATT.

Witnesses:
MORGAN CARR,
CYRUS H. SONTREL.